(12) United States Patent
Wang He

(10) Patent No.: US 9,250,375 B2
(45) Date of Patent: Feb. 2, 2016

(54) LIGHT GUIDE BAR AND LIGHT EMITTING DEVICE

(71) Applicant: HON HAI PRECISION INDUSTRY CO., LTD., New Taipei (TW)

(72) Inventor: Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 221 days.

(21) Appl. No.: 14/139,789

(22) Filed: Dec. 23, 2013

(65) Prior Publication Data

US 2014/0328081 A1 Nov. 6, 2014

(30) Foreign Application Priority Data

May 2, 2013 (TW) ................................. 102115674

(51) Int. Cl.
*F21K 99/00* (2010.01)
*F21V 8/00* (2006.01)
*F21Y 101/02* (2006.01)
*F21Y 103/00* (2006.01)

(52) U.S. Cl.
CPC . *G02B 6/001* (2013.01); *F21K 9/52* (2013.01); *F21Y 2101/02* (2013.01); *F21Y 2103/00* (2013.01)

(58) Field of Classification Search
CPC ................................. G02B 6/001; F21K 9/52
USPC .................................................... 362/555, 558
See application file for complete search history.

(56) References Cited

U.S. PATENT DOCUMENTS

2009/0290375 A1* 11/2009 Gingrich, III .......... G02B 6/001
362/612

FOREIGN PATENT DOCUMENTS

GB             2153515 A  *  8/1985  ............. G02B 6/001

* cited by examiner

*Primary Examiner* — David V Bruce
(74) *Attorney, Agent, or Firm* — Novak Druce Connolly Bove + Quigg LLP

(57) ABSTRACT

A light guide bar includes a light guide member and a light scattering member. The light guide member defines a cutout. The light guide member includes a first end surface, a second end surface, and a circumferential surface interconnected between the first end surface and the second end surface. The cutout is defined in the circumferential surface and passes through the first end surface and the second end surface. The light scattering member is received in the cutout and scatters light back to the light guide member. The light scattering member and the light guide member cooperatively form a complete cylinder, and a thickness of the light scattering member is less than a radius of the light guide member.

12 Claims, 3 Drawing Sheets

LIGHT GUIDE BAR AND LIGHT EMITTING DEVICE

BACKGROUND

1. Technical Field

The present disclosure relates to light guide technologies, and particularly to a light guide bar and a light emitting device having the light guide bar.

2. Description of Related Art

A light guide element, such as a light guide plate, is used to disperse light emitted from linear light sources, such as cold cathode ray tubes, or from point sources, such as light emitting diodes (LEDs). However, the light guide plate is substantially flat and cannot be used in many situations.

Therefore, it is desirable to provide a light guide bar and a light emitting device having the light guide bar to overcome or at least alleviate the above-mentioned problems.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The reference "a plurality of" means "at least two."

Figure 1:
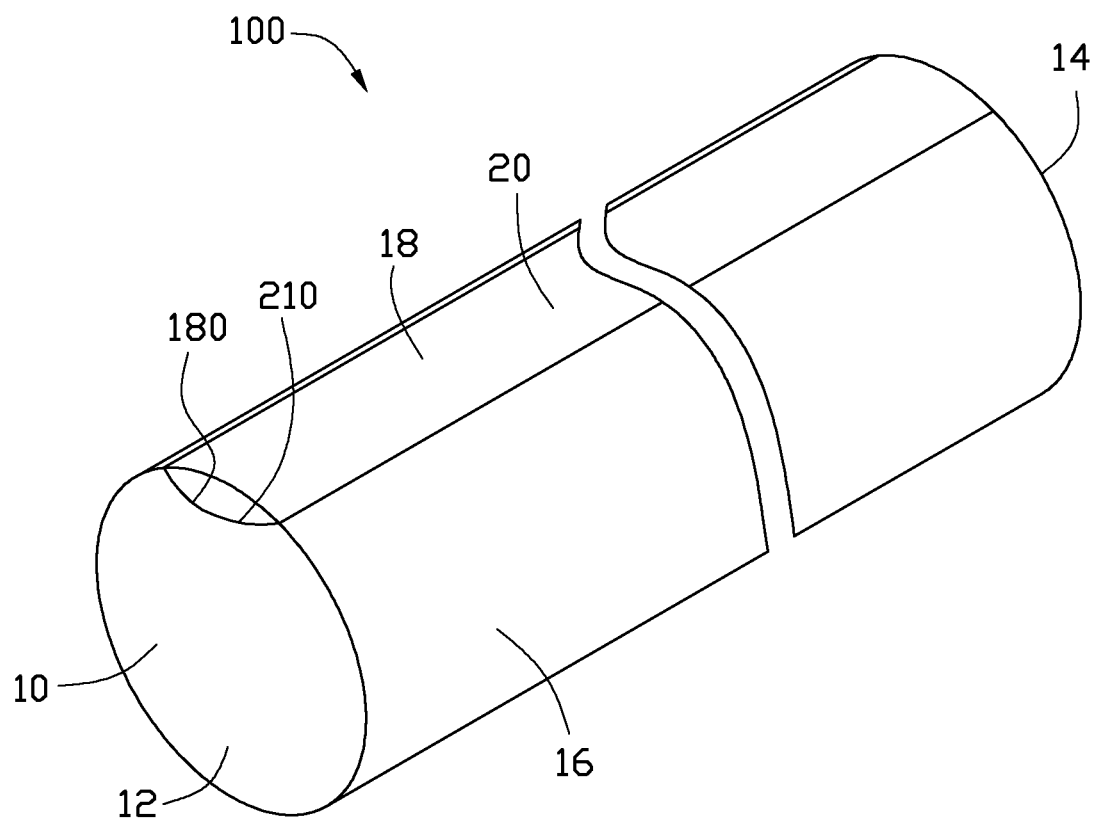
FIG. 1 is an isometric, schematic view of a first exemplary embodiment of a light guide bar.

FIG. 1 shows a first exemplary embodiment of a light guide bar 100. The light guide bar 100 includes a light guide member 10 and a light scattering member 20.

The light guide member 10 defines a cutout 18 in a top circumferential portion thereof. The light guide member 10 includes a first end surface 12, a second end surface 14, and a circumferential surface 16 interconnected between the first end surface 12 and the second end surface 14. The cutout 18 passes through the first end surface 12 and the second end surface 14. The light guide member 10 forms a bottom surface 180 corresponding to a bottom surface of the cutout 18. In one embodiment, the bottom surface 180 is curved. The light guide member 10 can be made of, but is not limited to be, polymethyl methacrylate (PMMA) or poly carbonate (PC).

Figure 2:
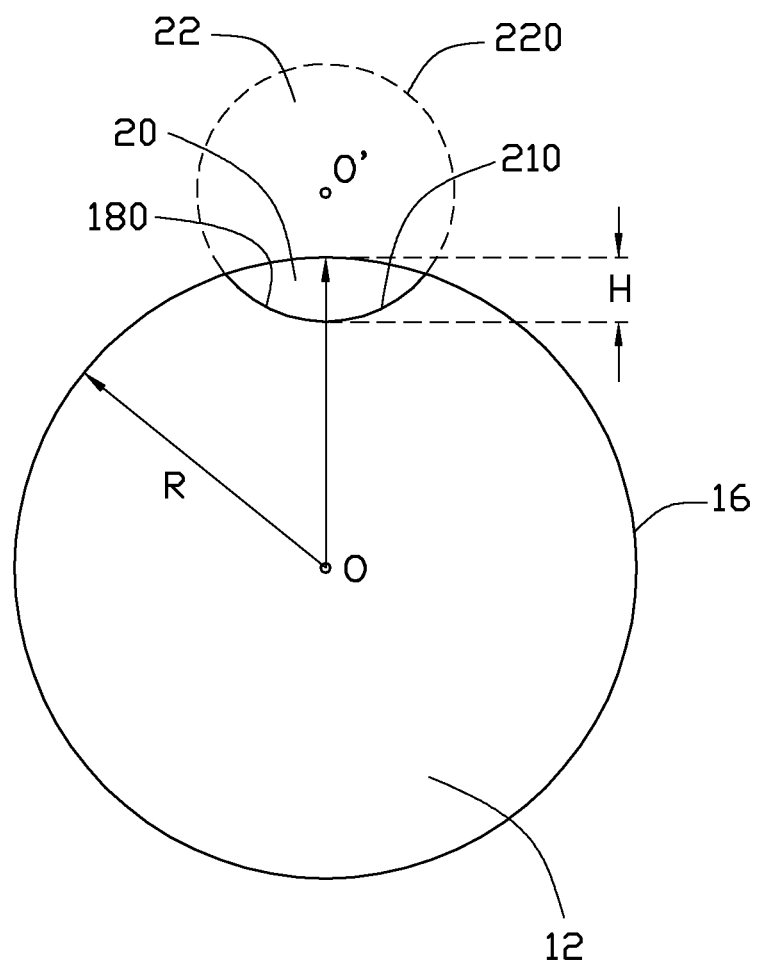
FIG. 2 is a schematic view of the light guide bar of FIG. 1.

The light scattering member 20 has a shape and size substantially similar to a shape and size of the cutout 18, and is received in the cutout 18. The light scattering member 20 and the light guide member 10 cooperatively form a complete cylinder. The light scattering member 20 includes a curved contact surface 210. A size and shape of the contact surface 210 matches a size and shape of the bottom surface 180. The contact surface 210 is configured for scattering light passing through the light guide member 10 back through the light guide member 10. Referring to FIG. 2, in this embodiment, the contact surface 210 is a portion of an imaginary circumferential surface 220 of an imaginary cylinder 22. A center O' of a cross-section of the imaginary cylinder 22 is located outside the light guide bar 100. A largest thickness H of the light scattering member 20 is less than a radius of the first end surface 12.

In one embodiment, the light scattering member 20 is made of polyethylene glycol terephthalate (PET), which can scatter light. The light guide member 10 and the light scattering member 20 are formed into a singular piece by a double injection molding machine. There is no need to form a number of microstructures on the light guide bar 100 because the light scattering member 20 is made of polyethylene glycol terephthalate (PET), which can scatter light.

In other embodiments, the light scattering member 20 can be made of other materials, and a frosted region is formed on the contact surface 210 by a sandblasting process or an electro-discharge machining process. The frosted region is configured for scattering light.

Figure 3:
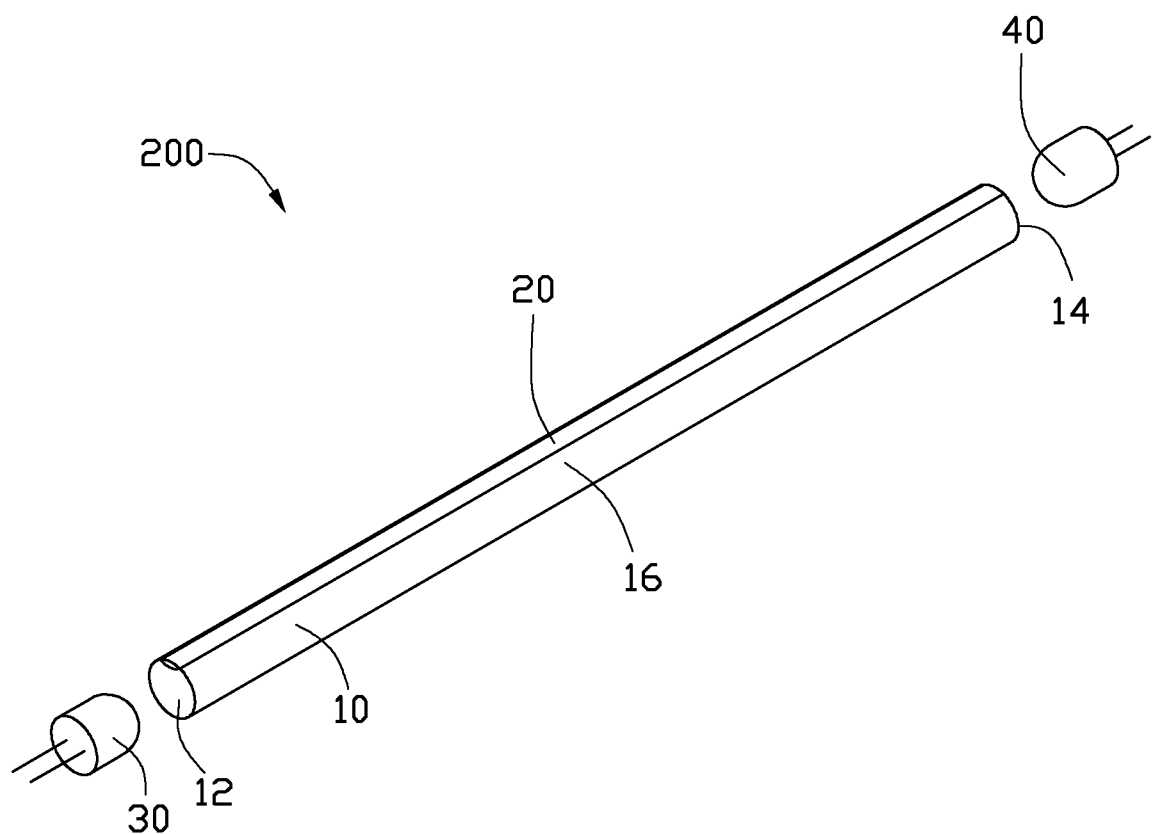
FIG. 3 is an isometric, schematic view of a second exemplary embodiment of a light emitting device.

FIG. 3 shows a second exemplary embodiment of a light emitting device 200. The light emitting device 200 includes the light guide bar 100 of the first embodiment, a first light source 30, and a second light source 40. The first light source 30 is located adjacent to the first end surface 12 of the light guide bar 100, and the second light source 40 is located adjacent to the second end surface 14 of the light guide bar 100. In detail, the first light source 30 is aligned with the first end surface 12, and the second light source 40 is aligned with the second end surface 14. Light emitted from the first light source 30 enters the light guide bar 100 through the first end surface 12, and light emitted from the second light source 40 enters the light guide bar 100 through the second end surface 14. Light traveling through the light guide member 10 is reflected by the light scattering member 20, until the light emits out of the light guide member 10 through the bottom surface 180.

Advantages of the light emitting device 200 of the second embodiment are similar to those of the light guide bar 100 of the first embodiment.

Even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A light guide bar comprising:
    a light guide member being substantially a cylinder with a cutout, the light guide member comprising a first end surface, a second end surface and a circumferential surface connecting the first end surface and the second end surface, the cutout defined in the circumferential surface along an axial direction of the light guide member and exposed at the first end surface and the second end surface; and
    a light scattering member received in the cutout for scattering light back to the light guide member, the light scattering member and the light guide member cooperatively forming a complete cylinder, and the largest radial thickness of the light scattering member being less than the radius of the light guide member.

2. The light guide bar of claim 1, wherein the light guide member further comprises a recessed bottom surface in the cutout, the bottom surface is an arc surface which is a portion of an imaginary cylinder, and the center of a cross-section of the imaginary cylinder is positioned outside the light guide bar.

3. The light guide bar of claim 1, wherein the light scattering member is made of polyethylene glycol terephthalate, and the light guide member is made of polymethyl methacrylate.

4. The light guide bar of claim 1, wherein the light scattering member is made of polyethylene glycol terephthalate, and the light guide member is made of poly carbonate.

5. The light guide bar of claim 1, wherein the light guide member and the light scattering member are formed into a unitary piece using a double injection molding machine.

6. The light guide bar of claim 2, wherein the light scattering member comprises a contact surface completely overlapped with and attached to the bottom surface, and a frosted region is formed on the contact surface by a sandblasting process or an electro-discharge machining process.

7. A light emitting device comprising:
    a light guide bar comprising:
        a light guide member being substantially a cylinder with a cutout, the light guide member comprising a first end surface, a second end surface and a circumferential surface connecting the first end surface and the second end surface, the cutout defined in the circumferential surface along an axial direction of the light guide member and exposed at the first end surface and the second end surface; and
        a light scattering member received in the cutout for scattering light back to the light guide member, the light scattering member and the light guide member cooperatively forming a complete cylinder, and the largest radial thickness of the light scattering member being less than the radium of the light guide member; and
    two light sources aligned with and facing the first end surface and the second end surface, respectively.

8. The light emitting device of claim 7, wherein the light guide member further comprises a recessed bottom surface in the cutout, the bottom surface is an arc surface which is a portion of an imaginary cylinder, and the center of a cross-section of the imaginary cylinder is positioned outside the light guide bar.

9. The light emitting device of claim 7, wherein the light scattering member is made of polyethylene glycol terephthalate, and the light guide member is made of polymethyl methacrylate.

10. The light emitting device of claim 7, wherein the light scattering member is made of polyethylene glycol terephthalate, and the light guide member is made of poly carbonate.

11. The light emitting device of claim 7, wherein the light guide member and the light scattering member are formed into a unitary piece using a double injection molding machine.

12. The light emitting device of claim 8, wherein the light scattering member comprises a contact surface completely overlapped with and attached to the bottom surface, and a frosted region is formed on the contact surface by a sandblasting process or an electro-discharge machining process.

* * * * *